Feb. 8, 1949.   F. G. KELLY   2,461,425
ELECTRICAL MEASURING SYSTEM
Filed Jan. 25, 1946

INVENTOR
FREDERICK G. KELLY
By Henry Lanahan
ATTORNEY

Patented Feb. 8, 1949

2,461,425

UNITED STATES PATENT OFFICE 2,461,425

ELECTRICAL MEASURING SYSTEM

Frederick G. Kelly, West Orange, N. J., assignor to Thomas A. Edison, Incorporated, West Orange, N. J., a corporation of New Jersey Application January 25, 1946, Serial No. 643,283

18 Claims. (Cl. 177—351)

This application is a continuation-in-part of my application Serial No. 587,767, filed April 11, 1945, now abandoned.

My invention relates to novel electrical measuring circuits for ratiometer-type receivers, and is concerned more particularly with novel circuits for telemetering systems.

In one form of my invention a transmitter is employed which is of a type adapted to produce two inversely-varying voltages in the measuring system according to the quantity to be measured. Typically, such transmitter may comprise a potentiometer having a single contact brush. This form of my invention is applicable to the transmission of various types of measurements and is, by way of preferred example, herein particularly illustrated in terms of a system for measuring pressure.

In another form of my invention a transmitter is employed which is of a type adapted to produce a single varying voltage in the measuring system according to the quantity to be measured. Various forms of transmitters may be used for this purpose, of which a rheostat and a resistor bulb may be mentioned as the most typical examples. This form of my invention is particularly useful for the remote indication of temperature, and is herein particularly described in terms of a system for this purpose but without intending any unnecessary limitation of my invention thereto.

My invention is concerned with measuring or telemetering systems of the two-phase type, the term "two-phase" being herein employed to refer to the number of spatially-related currents in the receiver to drive the movable indicating element. Such a receiver may be properly termed a ratiometer since it measures according to the ratio of two currents. It is an object of my invention to provide new and improved circuit arrangements for such two-phase telemetering systems.

It is another object to provide a two-phase telemetering system including a ratiometer-type receiver and potentiometer-type transmitter, which is especially suited for use on aircraft in that it is adapted to work dependably and accurately under extreme conditions of temperature and vibration. Another object is to provide a novel such telemetering system which is easily compensated accurately for the effect of wide variations in ambient temperature. Another object is to provide such a telemetering system which has a long indicating scale of uniform distribution. Another object is to provide an improved circuit for such telemetering system wherein the ratio of the currents in the receiver is varied substantially in direct proportion to the ratio of the resistances in the potentiometer and wherein, when a uniform potentiometer resistance is used, the receiver currents vary linearly in opposite directions, with their sum remaining substantially constant, in accordance with the movement of the contact brush.

It is another object to provide a novel circuit for the measurement of a single impedance element and of conditions or quantities representable in terms of such an element, and further it is an object to provide a novel such telemetering circuit for coupling a single-impedance transmitter to a ratiometer-type receiver.

Other objects and features of my invention will more fully appear from the following description and the appended claims.

In the description of my invention reference is had to the accompanying drawings, of which:

Figure 1:
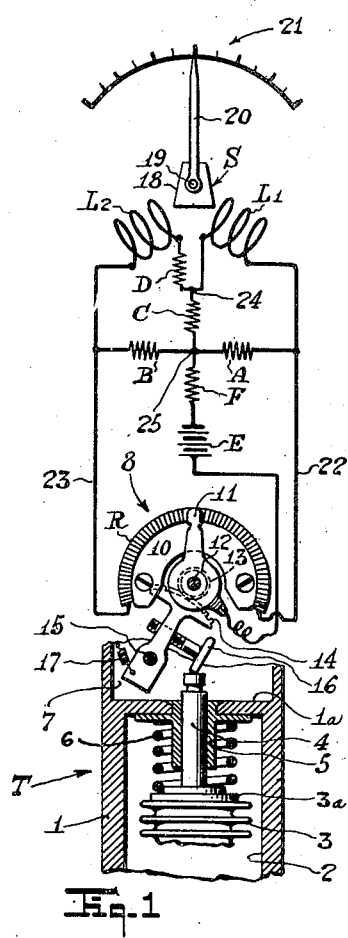
Figure 1 is a view of circuits and mechanisms according to one form of my invention, illustrating an improved two-phase telemetering system.

In Figure 1 I illustrate my invention in connection with a transmitter T of the single-contact potentiometer type such as is disclosed in my pending application Serial No. 561,623 filed November 2, 1944 and entitled Pressure operated rheostat (now Pat. No. 2,443,252). This is a transmitter adapted for direct mounting on aircraft engines for measuring the engine oil pressure. The transmitter comprises a casing (fractionally shown) having a lower chamber in which is housed a pressure-responsive member such as a bellows 3 (also fractionally shown). This bellows is suitably connected to the engine oil line and has the free end wall 3a thereof coupled to a plunger 4. This plunger is slidably mounted in a bearing 5 which is secured to a partition wall 1a of the casing. Under pressure of a compression spring 6 which is interposed between the wall 1a and the end wall 3a the bellows is subjected to compression, but in response to variations in the oil line pressure the bellows expands and contracts lengthwise against the force of the spring 6 to actuate the plunger 4.

In a top chamber 7 of the casing there is a potentiometer 8. This potentiometer has a resistance winding R, preferably of uniform resistance distribution, which is mounted for example on the peripheral surface of an arcuate member 10. Slidably engaging this resistance winding is a contact brush 11 carried by a shaft 12 at the center of the member 10. On this shaft there is a pinion 13 which meshes with a gear sector 14 that is pivoted at 15 as to the casing 1. Screw threaded into the gear sector is a circularly-headed laterally-extending arm 16. In response to a torsional bias of the gear sector, as provided by a spring 17, the head of this arm is held against the plunger 4. Movements of the plunger accordingly cause pivotal movements of the gear sector and corresponding amplified movements of the contact brush 11 along the resistance winding R. Thus, variations in oil-line pressure cause resistance variations in the transmitter T between the contact brush 11 and the respective extremities of the resistance winding R. It is a feature of this transmitter that these resistance variations bear a substantially linear relation to the oil-line pressure variations.

The receiver S with which my invention is employed may be any suitable ratiometer instrument comprising a pair of coils which when energized with currents of varying ratio will produce correspondingly varying deflections of the movable indicating element of the meter. Preferably, I employ a moving magnet type of ratiometer of the general character described and claimed in the pending Fritzinger application Serial No. 569,083, filed December 20, 1944, now Patent #2,446,579 issued August 10, 1948, and having a common assignee with the present application. This ratiometer, which is herein diagrammatically shown, comprises a tapered bar magnet 18, preferably of "Alnico." This magnet is pivoted at 19 and has secured thereto a pointer 20 the end portion of which overlies a scale 21. Two coils $L_1$ and $L_2$ are positioned about the magnet with their magnetic axes radial to the pivot axis 19 and spaced from one another by a suitable angle, say 130°. The magnet is magnetized along its central longitudinal axis. Accordingly, upon energizing only the $L_1$ coil in the right polarity the broad polar end of the magnet is attracted toward that coil into a position wherein the magnetic axis of the magnet is aligned with the axis of the coil and the pointer reads at the lower end portion of the scale. Upon energizing only the $L_2$ coil in the right polarity the magnet aligns itself with the axis of that coil and the pointer reads at the higher end portion of the scale. When however both coils are energized the magnet takes an intermediate position wherein its magnetic axis is aligned with the resultant flux field of the two coils. It is a feature of this ratiometer that upon increasing the current in one coil arithmetically by equal increments and concurrently decreasing the current in the other coil by the same increments the pointer will be deflected by equal divisions across the scale.

In aircraft applications, the transmitter T, particularly when directly mounted on the aircraft engine, is subjected to an incredibly severe vibration; also, in these applications the telemetering system is subjected to extremely wide ranges in ambient temperature. In order that such system may therefore operate dependably and accurately it must be substantially unresponsive to vibration and to changes in ambient temperature. By my invention I provide a novel measuring circuit for coupling a potentiometer-type transmitter to a ratiometer-type receiver which renders the receiver substantially unresponsive to contact interruptions in the transmitter and which lends itself, merely by choice of the temperature coefficients of its impedance components, to be compensated accurately for the effect of ambient temperature change. This circuit is also characterized favorably as having a high sensitivity and a linear response characteristic.

In this circuit the ratiometer coils $L_1$ and $L_2$ are serially connected across the potentiometer resistance R by leads 22 and 23, with the coil $L_1$ being connected to the right (clockwise) extremity of the resistance R and the coil $L_2$ to the left (counterclockwise) extremity of this resistance. Also connected across the potentiometer resistance R are resistors A and B in series, and connected from the junction 24 between the coils $L_1$ and $L_2$ and the junction 25 between the resistors A and B is a resistor C. A source of potential E is connected between the contact brush 11 of the potentiometer and the junction 25, preferably through a voltage-adjusting resistor F. By way of typical example, the ratiometer S is herein illustrated as being of the D.—C. type, and the potential source E is shown as a battery, but in its broader aspects it will be understood my invention is not limited to D.—C. operation.

Figure 2:
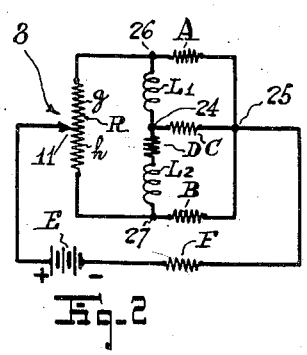
Figure 2 is a generalized schematic diagram of the circuit of Figure 1.

The circuit of Figure 1 has a generalized form shown in Figure 2. On reference to this figure it will be observed that the circuit comprises a resistance bridge of two parallel branches connected across the battery E of which the sections of the potentiometer resistance R constitute variable corresponding arms of the two branches and the fixed resistors A and B constitute the remaining two arms of these branches. Also it will be observed that the crossarm of the bridge comprises the coils $L_1$ and $L_2$ in series, that the contact brush 11 constitutes one junction of the two branches and that the resistor C is connected from a point in the crossarm between coils $L_1$ and $L_2$ to the other junction 25 of the two branches.

A distinguishing feature of this circuit lies in the provision of the resistor C. The prime function of this resistor is to cause the potential of the junction 24 in the crossarm to be stabilized as the contact brush 11 moves across the potentiometer resistance. An end result of this stabilizing action is to cause the currents in the coils to vary oppositely as the contact brush moves along the potentiometer resistance. For example, consider that when the contact brush is at an intermediate position the potential of the junction 24 is negative with respect to the junction of the coils $L_1$ and $L_2$ with the respective branches, these junctions being referred to as 26 and 27 respectively. As the contact brush 11 moves upwardly (Figure 2) the potential of the junction 26 is shifted towards the positive side of the battery and that of the junction 27 towards the negative side of the battery. Consequently the potential drop across the coil $L_1$ increases and that across the coil $L_2$ decreases, causing their currents to vary oppositely. Vice versa, as the brush 11 moves downwardly the current in the coil $L_1$ decreases and that in the coil $L_2$ increases.

Figure 3:
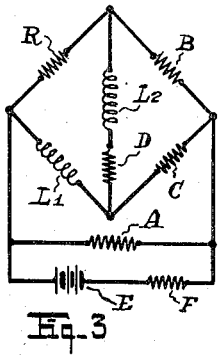
Figure 3 is a schematic diagram of the same circuit when the contact brush is at one end of its contact range.
Figure 4:
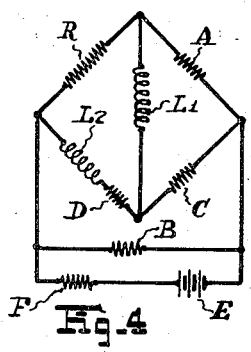
Figure 4 is a schematic diagram of this same circuit when the contact brush is at the other end of its contact range.

By properly selecting the resistance values of the components of the circuit the currents in the coils $L_1$ and $L_2$ will have maximum and zero values respectively as the contact brush reaches one extremity of the potentiometer resistance and will have the reverse values respectively as the contact brush reaches the other extremity. For example, it will be observed that when the contact brush reaches the upper extremity of the resistance R (Figure 2), the circuit is in effect converted into the simple bridge shown in Figure 3. The elements B and R form one branch of this bridge and the elements C and $L_1$ form the other branch, while the coil $L_2$ forms the crossarm of the bridge and the element A is directly connected across the batery E. As is readily apparent, upon adjusting the values of the resistances in the circuit to satisfy the equation $$\frac{B}{C} = \frac{R}{R_{L_1}}$$

where $R_{L_1}$ is the resistance of the coil $L_1$, the current in the coil $L_2$ is zero. Accordingly, only the coil $L_1$ is then energized and the pointer of the ratiometer reads at the lower end of the scale (Figure 1). When, however, the contact brush 11 reaches the lower extremity of the resistance R (Figure 2) the circuit is converted into a different simple bridge shown in Figure 4. Now the elements A and R form one branch of the bridge and the elements C and $L_2$ form the other branch, the coil $L_1$ being the cross-arm between the branches and the resistor B being connected across the battery. Upon adjusting the resistors to satisfy the equation $$\frac{A}{C} = \frac{R}{R_{L_2}+D}$$

where $R_{L_2}$ is the resistance of the coil $L_2$ and D is a compensating resistor hereinafter explained, the current in coil $L_1$ is zero. Accordingly, only the coil $L_2$ is energized and the pointer reads at the high end of the scale.

As the contact brush 11 moves clockwise (Figure 1) from the left end of the resistance winding R, current builds up through the coil $L_1$ and increases substantially linearly with the distance of travel of the arm across the winding; simultaneously, the current in the coil $L_2$ decreases substantially linearly with the distance of travel of the contact arm along the winding R. In other words, the sum of the currents in the two coils remains substantially constant. Of course, counterclockwise movements of the contact brush produce the reverse effects. Thus, the currents in coils $L_1$ and $L_2$ bear substantially the same relation to one another as do the resistances which appear between the contact brush 11 and the left and right extremities of the resistance winding R. As above explained, this is the condition desired in order that the receiver will have a linear response.

Preferably, the resistances of the coils $L_1$ and $L_2$ are made substantially equal. However, if one coil resistance is substantially smaller than the other a compensating resistance D may be included serially therewith, this resistance being shown by way of illustration as being in series with the $L_2$ coil in Figure 1. Also, such compensating resistance may be inserted for the additional purpose of controlling the indicator scale distribution as is disclosed and claimed in my Patent No. 2,362,562, issued November 14, 1944 and having a common assignee with the present application. When the coil resistances are made equal the resistors A and B are also to be equal according to the above-stated equations. The coil resistances are however made substantially smaller than the resistance winding R, preferably ¼ to 1/10, since the smaller this fraction is the smaller will be the effect of variations of the resistance winding R on the indications of the receiver. This is important because it is desirable to standardize the receivers and transmitters to be interchangeable. Typically, the resistor C may be equal to the respective coil resistances. Accordingly, the resistors A and B will be greater than the respective coil resistances by the ratio of the resistance winding R to the respective coil resistances.

Since the total current supplied to the telemetric system by the battery passes through the contact brush 11, any momentary interruption of contact of this brush with the resistance winding R due to vibration or other causes has only the effect of totally deenergizing the circuit. Unless the pointer is subjected to a strong biasing torque, it wil therefore tend to remain in its last indicating position during such contact interruption and will give a steady and accurate indication. Typically, a means (not herein shown) is provided for subjecting the pointer to a steady biasing torque so that it will move off the scale to a predetermined position when the meter is not in operation. However, this biasing torque is small compared to the operating torque of the meter, and the resulting displacement of the pointer which the biasing torque produces during contact interruptions is therefore very small.

A prime feature of the circuit hereinabove described is that it can be compensated wholly, throughout the range of the potentiometer 8, from error due to effects of varying ambient temperature. This compensation is conditioned upon the bridge being adjusted so that the currents of the coils $L_1$ and $L_2$ are zero when the contact 11 is at the left and right extremities respectively of the potentiometer resistance as shown in Figure 1 (the upper and lower extremities respectively as shown in Figure 2), which condition is as hereinbefore described. When this condition is met, true temperature compensation is obtained when the internal elements of the bridge, the elements $L_1$, $L_2$, D and C, have temperature coefficients equal to one another and the branch elements of the bridge, the elements R, A and B, have also temperature coefficients equal to one another. The temperature coefficient of each of the internal elements need however not be equal to that of each of the branch elements. Typically, the coils $L_1$ and $L_2$ are wound of copper wire, and therefore the resistance elements C and D are made also of copper or of a material having substantially the same temperature coefficient as that of copper. Typically, the potentiometer resistance R is to have a relatively high resistivity and a high resistance to wear. Other materials having these desired characteristics are those known to the trade as "Manganin" and "Advance," these materials being characterized incidentally as also having substantially negligible temperature coefficients.

Upon referring to Figure 2 it will be observed that upon properly adjusting the circuit elements the currents in the coils $L_1$ and $L_2$ will reach zero before the contact brush 11 reaches the respective extremities of the resistance R. For instance, the circuit may be adjusted so that the current in the $L_2$ coil will be zero when the contact arm 11 is at a point $g$ spaced from the upper extremity of the potentiometer resistance winding R. (Figure 2), and likewise so that the current in the $L_1$ coil will be zero when the contact arm is at a point $h$ spaced from the lower extremity of the potentiometer resistance R. As the contact arm 11 moves respectively through $g$ and $h$ to the respective extremities of the resistance R, the currents in the coils $L_2$ and $L_1$ pass through zero and take on reverse or negative values. At the same time the respective currents in the $L_1$ and $L_2$ coils continue to increase so that the algebraic sum of the coil currents tends to remain substantially constant. The resultant effect is to increase further the scale range of the receiver because a reverse current flowing through the $L_2$ coil will cause the pointer to be deflected further counterclockwise than were only the $L_1$ coil energized and, similarly, a reverse current in the $L_1$ coil will cause the pointer to be deflected further clockwise than were only the $L_2$ coil energized.

Figure 5:
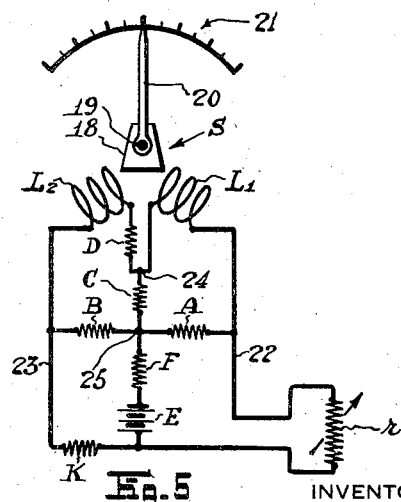
Figure 5 is a view of circuits and apparatus according to a second form of my invention.

In Figure 5 there is shown a second form of my invention, which is the circuit of Figure 1 except that the potentiometer 8 is replaced by a fixed resistor K and a variable transmitter resistor $r$. The variable transmitter resistor $r$ here constitutes a single-impedance type of transmitter. Typically, it may be a simple rheostat or a resistor bulb. By way of illustration, it is shown as a resistor bulb, in which case the system is adapted for the remote indication of temperature. A suitable bulb for this purpose may be that described and claimed in my pending application Serial No. 493,947, filed July 8, 1943 and entitled Resistor bulb (now Pat. No. 2,398,892.

Figure 6:
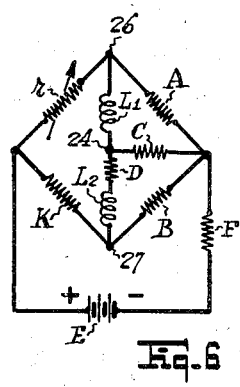
Figure 6 is a generalized schematic diagram of the circuit of Figure 5.

The circuit of Figure 5 has a generalized form shown in Figure 6 which is analogous to that of the circuit of Figure 2. The resistor C here performs a similar stabilizing function of tending to hold the potential of the junction 24 constant as the transmitter resistor $r$ is varied. For instance, the potential of the junction 27 is substantially uninfluenced by the transmitter resistor $r$. However, as the resistor $r$ decreases, the potential of the junction 26 becomes more positive when the battery is polarized as shown, and as it becomes more positive it carries the potential of the junction 24 towards the positive side of the battery to a lesser extent. If, for an intermediate value of R, the potential of the junction 24 is negative with respect to that of the junction 27, the current in the coil $L_1$ will increase and that in the coil $L_2$ will decrease as R decreases. Vice versa, as R increases, the current in the coil $L_1$ will decrease and that in the coil $L_2$ will increase. With proper adjustment of the circuit elements, the coil currents will vary oppositely between zero and maximum values, as limits, as R varies between predetermined limits. This circuit is therefore particularly well suited for coupling a single-impedance type transmitter to a ratiometer receiver.

I have herein shown and described my invention in terms of certain preferred embodiments, but it will be understood that these embodiments are illustrative and not limitative of my invention since the same are subject to changes and modifications without departure from the scope of my invention, which I endeavor to express according to the following claims.

I claim:

1. In a meter system comprising a ratiometer having two energizable coils: the combination of an electrical bridge comprising two parallel branches adapted for connection across a current source, an arm connected across said branches and comprising said coils in series, means included in said bridge for varying the potential drop across said arm, and means connected from a point in said arm between said coils to a junction of said branches for causing the currents in said coils to vary oppositely in response to variations in the potential drop across said arm.

2. In a meter system comprising a ratiometer having two energizable coils: the combination of an electrical bridge comprising two parallel branches adapted for connection across a current source, an arm connected across said branches and comprising said coils in series, variable impedance means in said bridge for varying the potential drop across said arm, and impedance means connected to a point in said arm between said coils for causing the currents in said coils to vary oppositely in response to variation of the potential drop across said arm.

3. In a meter system comprising a ratiometer having two energizable coils: the combination of a resistance bridge comprising two parallel branches adapted for connection across a current source, an arm connected across said branches and including said coils in series, variable resistance means in said bridge adjacent one of the junctions of said branches for varying the potential drop across said arm, and a fixed resistance connected from a point in said arm between said coils to the other junction of said branches for causing the current in one of said coils to increase and concurrently the current in the other of said coils to decrease as the potential drop varies across said arm.

4. In an electrical measuring system including a ratiometer having two energizable coils, means for producing two oppositely-varying impedances in response to variations in the condition to be measured and an electrical bridge adapted for connection across a current source and including said varying impedances as corresponding arms of the branches thereof: the combination of an arm connected across said branches and including said coils in series, the potential drop across said arm being varied in response to the said variation of the two impedances; and means connected from a point between said coils to a point in said bridge for causing the currents in said coils to vary oppositely as the potential drop varies across said arm.

5. In an electrical measuring system including a ratiometer having two energizable coils, an electrical bridge comprising two parallel branches adapted for connection across a current source, said branches having corresponding arms comprising a resistance potentiometer, said potentiometer having a contact brush constituting one junction of said branches: the combination of an arm connected across said branches and including said coils in series, and a resistance connected from a point between said coils to the other junction of said branches.

6. The combination set forth in claim 6 wherein the resistances of said coils are substantially equal and are respectively equal to a minor fraction of the value of said potentiometer resistance.

7. In a telemetric system including a transmitter resistance, a contact for traversing said resistance, and a ratiometer-type receiver including two energizable coils: a circuit arrangement for electrically connecting said transmitter to said receiver comprising one electrical bridge wherein one of said coils constitutes the crossarm thereof when said contact registers with one extremity of said transmitter resistance and comprising another electrical bridge wherein the other of said coils constitutes the crossarm thereof when said contact registers with the other extremity of said resistance.

8. In an electrical measuring system including a ratiometer having two energizable coils: the combination of a resistance bridge comprising two parallel branches adapted for connection across a current source, said branches having corresponding arms comprising fixed resistors respectively and other corresponding arms comprising a resistance potentiometer, said potentiometer having a contact brush constituting one junction of said branches, said potentiometer and fixed resistors being characterized as having substantially equal temperature coefficients; an arm connected across said branches and including said coils in series; and an added resistor connected from a point between said coils to the other junction of said branches, said coils and added resistor being characterized as having substantially equal temperature coefficients.

9. A telemeter system comprising a transmitter resistance, a contact for traversing said resistance, first and second resistors connected serially across said transmitter resistance, means for connecting a source of potential between said contact and a point between said first and second resistors, a receiver comprising two energizable coils connected serially across said transmitter resistance, and a third resistor serially interposed between said point and a point between said coils.

10. The subject matter set forth in claim 10 wherein said transmitter resistance and said first and second resistors have substantially negligible temperature coefficients, and wherein said coils and said third resistor have positive and substantially equal temperature coefficients.

11. In an electrical measuring system including a transmitter resistance, a contact movable across said resistance, and a ratiometer including two energizable coils: an electrical bridge comprising two branches in parallel of which said transmitter resistance constitutes two corresponding arms of said branches and said contact constitutes one junction of said branches, first and second fixed resistances in said branches respectively and constituting two other corresponding arms thereof, an arm across said branches including said coils in series, a third fixed resistance connected from a point in said arm between said coils to the other junction of said branches, said bridge being adjusted to cause the current in one of said coils to be substantially zero when said contact is at one extremity of said transmitter resistance and the current in the other of said coils to be zero when the contact is at the other extremity of said transmitter resistance, said coils and third resistance having substantially equal temperature coefficients, and said transmitter resistance and first and second resistances having substantially equal temperature coefficients.

12. In a meter system comprising a ratiometer having two coils, and an electrical bridge having two parallel branches adapted for connection across a current source: the combination of a crossarm in said bridge comprising said coils in series, and an impedance element connected from the junction between said coils to one junction of said branches.

13. In a meter system comprising a ratiometer having two coils, and an electrical bridge having two parallel branches adapted for connection across a current source, one of said branches including two fixed resistors in series and the other including a variable resistor to be measured and a fixed resistor in series therewith: the combination of a crossarm serially including said coils and connected across said branches from the junction between the said resistors of said one branch to the junction between the said resistors of the other branch, and means connected to a point in said arm between said coils for causing the currents in said coils to vary oppositely as said variable resistor is varied.

14. In a meter system comprising a ratiometer having two coils, and an electrical bridge having two parallel branches adapted for connection across a current source, one of said branches including two fixed resistors in series and the other including a variable resistor to be measured and a fixed resistor in series therewith: the combination of a crossarm serially including said coils and connected across said branches from the junction between the said resistors of said one branch to the junction between the said resistors of the other branch, and means connected from a point in said arm between said coils to a point in said bridge and effective as said variable resistor is varied for causing the currents in said coils to vary oppositely.

15. In a meter system comprising a ratiometer having two coils, and an electrical bridge having two parallel branches adapted for connection across a current source, one of said branches including two fixed resistors in series and the other including a variable resistor to be measured and a fixed resistor in series therewith: the combination of a crossarm serially including said coils and connected across said branches from the junction between the said resistors of said one branch to the junction between the said resistors of the other branch, and a fixed resistor connected from the junction between said coils to the junction of said branches which is opposite the junction thereof adjacent to said variable resistor.

16. In a meter system including a ratiometer: the combination of a resistance to be measured and three fixed resistors arranged in the form of a bridge consisting of two branches adapted for connection across a current source, two coils comprised in said ratiometer and serially connected across said branches, and an added resistor connected from the junction between said coils to the junction of said branches which is between two of said fixed resistors.

17. In a meter system comprising a ratiometer having two energizable coils: the combination of an electrical bridge having two parallel branches adapted for connection across a current source, said branches having corresponding arms including fixed impedances respectively; an arm connected across said branches and including said coils in series; and an impedance element connected from a point in said cross arm between said coils to the junction of said branches between said fixed impedances, said impedance element having a value substantially different from the mean value of said fixed impedances.

18. The combination set forth in claim 17 wherein said fixed impedances are substantially equal, and said impedance element has a value substantially smaller than that of the respective fixed impedances.

FREDERICK G. KELLY.

REFERENCES CITED

The following references are of record in the file of this patent:

UNITED STATES PATENTS

| Number | Name | Date |
|---|---|---|
| 2,333,406 | Ballard | Nov. 2, 1943 |
| 2,362,562 | Kelly | Nov. 14, 1944 |
| 2,391,058 | Lingel | Dec. 18, 1945 |
| 2,393,197 | Scott | Jan. 15, 1946 |
| 2,399,903 | Anderson | May 7, 1946 |

Certificate of Correction

February 8, 1949

Patent No. 2,461,425

FREDERICK G. KELLY

It is hereby certified that error appears in the printed specification of the above numbered patent requiring correction as follows:

Column 9, line 3, for the claim reference numeral "6" read 5; line 49, for the claim reference numeral "10" read 9;

and that the said Letters Patent should be read as corrected above, so that the same may conform to the record of the case in the Patent Office.

Signed and sealed this 8th day of May, A. D. 1951.

[SEAL]

THOMAS F. MURPHY,
*Assistant Commissioner of Patents.*